United States Patent [19]

Molteni

[11] Patent Number: 4,578,231

[45] Date of Patent: Mar. 25, 1986

[54] PROCESS FOR THE PRODUCTION OF POLYOLEFIN FOAMS

[75] Inventor: Emanuele Molteni, Inverigo, Italy

[73] Assignee: Bayer Aktiengesellschaft, Leverkusen-Bayerwerk, Fed. Rep. of Germany

[21] Appl. No.: 589,620

[22] Filed: Mar. 14, 1984

[30] Foreign Application Priority Data

Mar. 28, 1983 [EP] 03281983 ............... 83103046.5

[51] Int. Cl.[4] .............. B29C 67/22; B29C 47/88; C08J 3/24

[52] U.S. Cl. .................................. 264/25; 264/26; 264/54; 264/DIG. 18; 521/128; 521/134; 521/138; 521/915

[58] Field of Search .............. 264/51, DIG. 18, 54, 264/26

[56] References Cited

U.S. PATENT DOCUMENTS

| | | | |
|---|---|---|---|
| 3,390,105 | 6/1968 | Verdol | 264/DIG. 18 |
| 3,413,244 | 11/1968 | Landler et al. | 264/DIG. 18 |
| 4,163,085 | 7/1979 | Kühnel et al. | 264/DIG. 18 |
| 4,239,714 | 12/1980 | Sparks et al. | 264/DIG. 18 |
| 4,454,256 | 6/1984 | Pellicelli | 521/138 |

FOREIGN PATENT DOCUMENTS 1024654 2/1958 Fed. Rep. of Germany.
1126857 9/1968 United Kingdom.

*Primary Examiner*—Philip Anderson
*Attorney, Agent, or Firm*—Connolly and Hutz

[57] ABSTRACT

An improved process for the production of cross-linked polyolefin foams by mixing polyolefins with conventional foaming agents and cross-linking agents known for polyolefin foam production, shaping the mixture into a plate or into a continuous sheet, substantially without cross-linking and foaming, the improvement comprises mixing said mixture with up to 50% by weight of an $\alpha,\beta$-unsaturated polyester, heating the plate or sheet optionally by IR radiation, and cross-linking the foaming by dielectric heating at a temperature above the decomposition temperature of the cross-linking and foaming agents.

9 Claims, 1 Drawing Figure

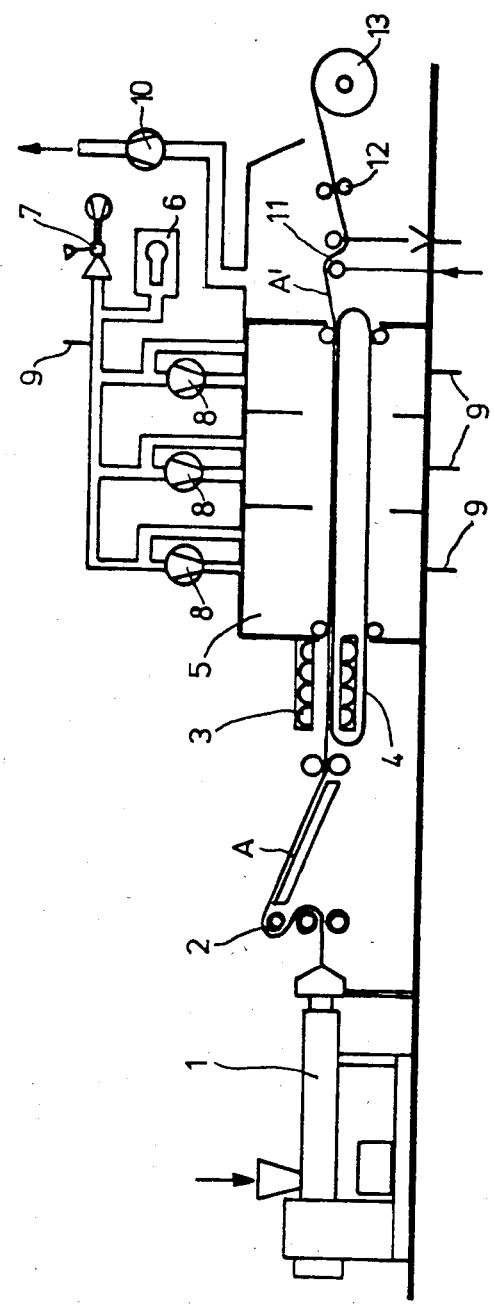

PROCESS FOR THE PRODUCTION OF POLYOLEFIN FOAMS

This invention relates to a process for the production of polyolefin foams which comprises effecting the cross-linking and foaming operations by means of microways.

It is known that polyolefin foams may be produced by discontinuous or continuous methods. The foams are preferably produced by mixing the polyolefins with a foaming agent, a cross-linking agent and with suitable additives on a role mill or in an extruder with subsequent shaping, preferably into plates or endless sheets, at a temperature below the decomposition point of the cross-linking and foaming agents. Moreover, the average residence time in the mixing apparatus is calculated such that there is substantially no cross-linking of the mixture to be foamed during this stage.

Thereafter, by gradually rising the temperature, initially only the cross-linking takes place with an increase in the melt viscosity of the polyolefin, and then the cross-linking and foaming of the polymer composition takes place by means of hot air, with a further increase in temperature and with decomposition of the foaming agent. These procedures are effected either in a continuous or a discontinuous manner, that is, by heating the material simply by means of hot air or by the effect of high-energy beams, or by both methods simultaneously.

Depending on the quantity of foaming agent and on the degree of cross-linking, foams are produced which have a density of from 15 to 300 kg/m$^3$, preferably from 20 to 200 kg/m$^3$.

More preferably processes for the production of continuous foam sheets are used, as described, for example in DE-AS No. 1,694,130. According to these processes, heating takes place in a hot-air furnace, while the continuous cross-linking and foaming polyolefin sheet is supported on an endless conveyor belt.

Since polyolefins are poor conductors of heat, it is only possible to produce foams up to a relatively small thickness by known processes, because a rapid heating of the complete polyolefin sheet during cross-linking and foaming is necessary and a supply of too much heat may result burnt surfaces of the polyolefin sheet. Moreover, a considerably amount of energy is lost during the transmission of heat through the air.

Therefore, attempts have already been made to avoid heating with hot air, and to achieve the cross-linking and foaming operations by means of dielectric heating, in particular by means of microwaves, preferably at a frequeny of from 300 to 3,000 MHz.

Since polyolefins cannot be heated sufficiently by dielectric means, the cross-linking and/or foaming agents have been modified to make the production of cross-linked polyolefin foams by microwaves available. Such processes have the serious disadvantage that they cannot be carried out by using the commonly used additives, but requires the preparation of specifically modified cross-linking and foaming agents.

Surprisingly, it has now been found that these difficulties are avoided by adding to the polyolefin moulding composition to be cross-linked and foamed, up to 50% by weight, based on the total mixture, of at least on α,β-unsaturated polyester.

Therefore, this invention relates to an improved process for the production of polyolefin foams which comprises mixing the polyolefins with conventional foaming and cross-linking agents and shaping the mixtures without cross-linking and foaming to sheet, the improvement comprises mixing said mixture with up to 50% by weight, preferably from 3 to 20% by weight, and more preferably from 5 to 10% by weight, based on said starting mixture, of an α,β-unsaturated polyester shaping the mixture into a plate or a continuous sheet heating, the moulding optionally by means of infrared radiation, to a temperature of at most 10° C. below the softening temperature of the polyolefin and cross-linking and foaming said sheet by dielectrical heating, preferably using microwaves, to a temperature above the decomposition temperature of the cross-linking and foaming agent.

The foams prepared according to the present invention are preferably produced by mixing the polyolefins with conventional foaming agents, cross-linking agents, optionally other conventional additives and the amount of polyester which is used according to the present invention, on a roll mill or an extruder, subsequently by producing the moulding, for example a plate or continuous sheet, at a temperature below the decomposition point of the cross-linking and foaming agents. The average residence time in the mixing apparatus is calculated such no cross-linking of the mixture takes place. The mouldings may be subjected to an intermediate storage or they may be cross-linked and foamed while being still hot. If the mouldings are subjected to intermediate storage, it is advisable to warm them with IR rays before the cross-linking and foaming operations are performed by means of microwaves. The plate or continuous sheet is then heated by means of microwaves which are generated by a standard UHF-wave generator, to a temperature above the decomposition point of the cross-linking agent, preferably also above the decomposition point of the foaming agent. This heating operation is preferably carried out in an insulated chamber, with the moulding to be foamed being supported on an endless belt, preferably on a perforated belt. A hot-air furnace is more preferably used as this chamber in order to be able to control the cross-linking and foaming temperature even more accurately and particularly with the greatest regularity over the complete moulding to be foamed, by simultaneously using the microwave effect and the hot air effect.

The process according to the present invention is preferably carried out as illustrated schematically in FIG. 1. In this Figure the starting mixture is mixed in an extruder (1) and is extruded into a continuous sheet (A). The polyolefin sheet is then smoothed by calander rollers (2) and is pre-heated by IR rays (3). The sheet is conveyed by and supported on an endless belt (4) in a furnace (5) and is cross-linked and foamed by microwaves which are generated in a generator (6), and optionally by hot air which is maintained at the required temperature by a methane burner (7). The furnace is equipped with blackflow fans (8) and with air temperature regulators (9). The cross-linked foamed polyolefin sheet (A') is cooled on cooling rollers (11), waste gases being removed by a fan of a ventilating dome (10). After the foamed sheet has been smoothed by means of calander rollers (12), it is wound up on a winding device (13).

Polyethylene or polypropylene, or mixtures thereof may be preferably used as polyolefin for the inventive process. The more prefered polyolefins are polyethylene like low pressure polyethylene having a density of from 0.94 to 97 g/cm$^3$ and/or high pressure polyethylene having a density of from 0.91 to about 0.94 g/cm$^3$, most preferably high pressure polyethylenes. However, the term "polyolefins" should also include polyolefin copolymers, preferably those obtained from monomer mixture containing predominantly α-olefin.

Copolymers for example ethylene-propylene, ethylene-butylene, of ethylene and acrylates or derivatives thereof, of ethylene and methacrylic acid or derivatives thereof can be used. Mixtures of the above-mentioned polyolefins with rubbers and/or resins may also be processed into foams according to the inventive process. These mixtures should consist of at least 50% by weight of polyolefins. Rubbers which may be mixed with polyolefins include the following, for example: natural rubber, ethylenepropylene rubber, butyl rubber, polyisobutylene, ABS rubber, polybutadiene, polybutene and polyisoprene. Resins which may be mixed with polyolefins are, for example: polystyrene, chlorinated polyethylene or sulphochlorinated polyethylene.

In the inventive process, the conventional organic peroxides are preferably used as cross-linking agents which have already been used for the production of polyolefin foams like dicymylperoxide, 2.5-di-(tert.-butyl-peroxy)-hexane, tert.-butylhydroperoxide, cumyl-tert.-butylperoxide and di-tert.-butylperoxide. Dicumylperoxide is preferably used. The peroxides are used in quantities of from 0.3 to 1.5% by weight, based on the mixture to be cross-linked and foamed.

Known blowing agents which release gas under elevated temperature are used as foaming agents, the decomposition temperature of which is the same as, or is higher than that of the organic peroxide which is used.

Conventional foaming agents which are used for the polyolefin foam production and which have not been modified to be dielectrically heatable are preferably azodicarbonamide and/or p,p'-oxy-bis-benzene-sulphonylhydrazide and/or dinitrosopentamethylenetetramine.

Azodicarbonamide having a decomposition point or a decomposition range from at least 190° C. is the preferred foaming agent. The quantity of foaming agent which is used depends on the desired density of the foam to be produced, and generally ranges from 0.5 to 25% by weight, preferably from 1 to 20% by weight, based on the total mixture to be cross-linked and foamed.

α,β-unsaturated polyesters used as available modifiers for making heating with microwaves are preferable known polycondensation products of at least one α,β-mono-unsaturated dicarboxylic acid having from 4 to 8 carbon atoms, or derivatives thereof, for example anhydrides, optionally in admixture with up to 200 mol %, based on the unsaturated dicarboxylic acid, of at least one saturated aliphatic or cycloaliphatic or aromatic dicarboxylic acid having from 8 to 10 carbon atoms, or derivatives therof, with at least one aliphatic, cycloaliphatic or aromatic polyhydroxy compound, in particular dihydroxy compounds having from 2 to 8 carbon atoms, preferably polyesters, as described by J. Bjorksten et al., in "Polyesters and their Applications", Reinhold Publishing Corp., New York 1956.

Examples of unsaturated dicarboxylic acids which are preferably used or derivatives thereof are maleic acid or fumaric acid or their anhydrides. However, mesaconic acid, citraconic acid, itaconic acid or chloromaleic acid, for example may also be used. Examples of the aromatic, saturated aliphatic or cycloaliphatic dicarboxylic acids which can be optionally added or derivatives thereof include phthalic acid or phthalic acid anhydride, isophthalic acid, terephthalic acid, hexa- or tetrahydrophthalic acid or anhydrides thereof, endomethylenetetrahydrophthalic acid or anhydrides thereof, succinic acid or succinic acid anhydride and succinic acid esters and succinic acid chlorides, adipic acid and sebacic acid. In order to produce substantially inflammable resins, halogenated dicarboxylic acids may also be used additionally, for example hexachloroendomethylenetetrahydrophthalic acid, tetrachlorophthalic acid or tetrabromophthalic acid. The following are preferably used as difunctional alcohols: $C_2$-$C_{20}$ aliphatic alcohols like ethylene glycol, propanediol-1,2, propanediol-1,3, butanediol-1,4, neopentyl glycol, hexandiol-1,6, 2,2-bis-(4-hydroxycyclohexyl)-propane, perhydrobisphenol and as phenols preferably bis-oxalkylated bisphenol A. Ethylene glycol, propanediol-1,2, diethylene glycol and dipropylene glycol are preferably used.

Modification of the polyester component by condensing mono-, tri- and tetra-hydric alcohols having from 1 to 6 carbon atoms, such as methanol, ethanol, butanol, allyl alcohol, benzyl alcohol, cyclohexanol and tetrahydrofurfuryl alcohol, trimethylpropane, glycerine and pentaerythritol, of mono-, di- and triallyl ethers and benzyl ethers of tri- and poly-hydric alcohols haveing from 3 to 6 carbon atoms according to DE-AS No. 1,024,654, for example trimethylolpropanediallylether, and by the incorporation of monocarboxylic acids, such as benzoic acid or acrylic acid are possible too.

The acid numbers of the polyesters preferably range from 10 to 100, and more preferably from 20 to 70. The OH numbers of the polyesters range from 10 to 150, preferably from 20 to 100, and the molecular weights $\overline{M}_n$ determined as a numerical average range from about 500 to 5000, preferably from about 1000 to 3000 (measured by vapour pressure osmometry in dioxane and acetone).

Unsaturated compounds which are conventionally used in polyester technology and which preferably have α-substitued vinyl groups or vinylidene groups or β-substituted allyl groups, preferably styrene, are suitable as unsaturated monomers which may be copolymerised with the unsaturated polyesters. However, nuclear-chlorinated and nuclear-alkylated or -alkenylated styrenes, for example, are also suitable, and the alkyl groups may contain from 1 to 4 carbon atoms, for example vinyltoluene, divinylbenzene, α-methylstryene, tert.-butylstyrene, chlorostryenes; vinylesters of carboxylic acids having from 2 to 6 carbon atoms, preferably vinylacetate, vinylpropionate, vinylbenzoate, vinylpyridine, vinylnaphthalene, vinylcyclohexane, acrylic acid and methacrylic acid and/or esters thereof (preferably vinyl, allyl and methallyl esters) having from 1 to 4 carbon atoms in the alcohol component, amides and nitriles thereof, maleic acid anhydride, -semi- and -diesters having from 1 to 4 carbon atoms in the alcohol component -semi- and -diamides or cyclic imides, such as butylacrylate, methyl methacrylate, acrylonitrile, N-methylmaleinimide, or N-cyclohexylmaleinimide; allyl compounds, such as allylbenzenes and allylesters such as allylacetate, phthalic acid daillylesters, isophthalic acid diallylesters, fumaric acid diallylester, allylcarbonates, diallylcarbonates, triallylphosphate and triallylcyanurate.

Moreover, surprisingly, the addition of the unsaturated polyesters also allows to reduce the usual necessary amount of peroxide for a sufficient cross-linking.

In addition to the economic advantages, a consequence of this reduction is the fact that the rather ill-smelling decomposition products of dicumylperoxide, which is preferably used, such as acetophenone are produced in much smaller quantities.

Conventional additives for polyolefin resins like light-protecting agents, pigments, fillers, flame-inhibiting agents, antistatic agents and lubricants may also be added to the mixture to be cross-linked and foamed before it is processed into a moulding.

The dielectric heating operation, preferably using microwaves at a frequency of from 300 to 3000 MHz, preferably from 2000 to 3000 MHz and more preferably 2450 may be carried out using a standard generator.

Additionally, the inventively produced polyolefin foams themselves may also be heated dielectrically which allows an advantageous further processing of these foams. Therefore, by means of dielectric heating, for example, high-frequency welding, high-frequency shaping and high-frequency stamping at a frequency of about 27 MHz is possible. Consequently, temperature-sensitive materials, such as textile fabrics may in particular be easily bonded to the inventively produced polyolefin foams.

EXAMPLE

A mixture of the following materials in the specified parts by weight is extruded on an extruder into a plate:
High pressure polyethylene—50 parts by weight
Chlorinated polyethylene—30 parts by weight
Unsaturated polyester—5 parts by weight
Azodicarbonamide—13.7 parts by weight
Dicumylperoxide—0.3 parts by weight The unsaturated polyester was produced by the polycondensation of maleic acid anhydride ethylene, propylene glycol, ethylene glycol and benzyl alcohol.

The extrusion temperature is about 130° C., so that neither foaming nor cross-linking takes place.

The plate thus obtained is heated to a temperature of about 210° C. in a hot-air furnace, as indicated in FIG. 1, by means of microwaves at a frequency of 2450 MHz, as a result of which, a regular cross-linking and foaming of the polyolefin sheet is achieved. The air in the furnace is maintained at about 200° C.

The foamed sheet is cooled by fresh air and by bringing into contact with cooled rollers. The foam exhibits a smooth surface and has a bulk density of 35 kg/m$^3$.

I claim:

1. In an improved process for the production of cross-linked polyolefin foams by mixing polyolefins with conventional foaming agents and cross-linking agents known for polyolefin foam production, shaping the mixture into a plate or into a continuous sheet, substantially without cross-linking and foaming, the improvement comprises mixing said mixture with up to 50% by weight of an $\alpha,\beta$-unsaturated polyester, with or without heating the plate or sheet by IR radiation, and cross-linking and foaming by dielectric heating at a temperature above the decomposition temperature of the cross-linking and foaming agents.

2. A process as claimed in claim 1, wherein the dielectric heating is carried out using microwaves.

3. A process as claimed in claim 1, wherein the microwaves have a frequency of from 300 to 3000 MHz.

4. A process as claimed in claim 1, wherein the dielectric heating is carried out in a hot-air furnace.

5. A process as claimed in claim 1, wherein hot air is used for the supply of heat in addition to the dielectric heating operation.

6. A process as claimed in claim 1, wherein from 3 to 20% by weight, based on the starting mixture, of an unsaturated polyester are mixed.

7. A process as claimed in claim 1, wherein the polyester is hardened up to 100%.

8. A process as claimed in claim 1, wherein a polyester is used which has an acid number of from 10 to 100 and an OH number of from 10 to 150.

9. A process as claimed in claim 8, wherein a polyester is used which has an acid number of from 20 to 70 and an OH number of from 20 to 100.

* * * * *